UNITED STATES PATENT OFFICE.

CHARLES DUBOIS, OF MARSEILLES, FRANCE.

IMPROVEMENT IN PAINT COMPOSITIONS.

Specification forming part of Letters Patent No. 179,004, dated June 20, 1876; application filed April 21, 1876.

*To all whom it may concern:*

Be it known that I, CHARLES DUBOIS, of Marseilles, France, have invented Improved Anti-Fouling Paints or Compositions for Ships' Bottoms and other submerged structures; and I do hereby declare that the following is a full, clear, and exact description of the same.

My invention relates to improvements in anti-fouling paints or compositions; and it consists in the application therein of certain corrosive substances, hereafter mentioned, for preventing the adherence of barnacles and marine vegetation.

I have found by experience that the sulpho-cyanide of copper acts as a preventive against the adherence of barnacles and shell-fish, and that, when combined with phenic acid, whether in the crude or crystallized state, it has a similar effect on marine vegetation. My invention, therefore, consists in a composition of sulpho-cyanide of copper and of phenic acid.

Sulpho-cyanide of copper, as prepared by me, acts in paint in a similar manner to zinc white. When reduced to powder, it is almost white, with a light greenish tinge, so that when employed in paints as a corrosive agent it does not in any way affect the color of the paint. It may be intimately mixed with tallow and other grease, tar, black varnish, vegetable, mineral, or other oils.

The addition of phenic acid in paints may be effected in various ways. If crystallized, I dissolve it in oils, spirits, or varnish, and incorporate it, in a liquid state, with the paint; and, if crude, it may be employed directly.

The phenic acid may also be applied as the vehicle for the paint by preparing the latter in a pasty form, and mixing it with crude phenic acid, or crystallized phenic acid in solution, the acid serving as a substitute for the oil generally used.

The first coat of the phenicated paint serves to protect the metal from the oxidization due to galvanic action. The second coat more particularly has a poisonous action on marine animal and vegetable life.

The proportion of the sulpho-cyanide of copper and of the phenic acid which I prefer to use in the paint is about one per centum of the sulpho-cyanide of copper and five per centum of the phenic acid by weight; but these proportions may be varied according to the greater or less energy with which the paint is required to act.

I claim—

The composition in ships' paint of sulpho-cyanide of copper and phenic acid, substantially as and for the purpose specified.

CHARLES DUBOIS.

Witnesses:
E. ALBERT,
S. ALVIKE.